US012608899B2

(12) United States Patent
Lin et al.

(10) Patent No.: US 12,608,899 B2
(45) Date of Patent: Apr. 21, 2026

(54) INTERACTIVE LABELING METHOD FOR 3D DYNAMIC OBJECT BASED ON TIME SERIES DATA, KEY FRAMES, AND INTERPOLATED FRAMES

(71) Applicant: Molar Intelligence(Hangzhou)CO. LTD., Zhejiang (CN)

(72) Inventors: Qunshu Lin, Zhejiang (CN); Minghao Liu, Zhejiang (CN); Xinjun Wu, Zhejiang (CN); Shigang Qi, Zhejiang (CN); Yi Yang, Zhejiang (CN); Chao Zhang, Zhejiang (CN); Zijian Zhao, Zhejiang (CN); Qijun Shao, Zhejiang (CN)

( * ) Notice: Subject to any disclaimer, the term of this patent is extended or adjusted under 35 U.S.C. 154(b) by 0 days.

(21) Appl. No.: 18/906,222

(22) Filed: Oct. 4, 2024

(65) Prior Publication Data

US 2026/0038214 A1     Feb. 5, 2026

(30) Foreign Application Priority Data

Aug. 5, 2024     (CN) .......................... 202411062156.2

(51) Int. Cl.
  *G06T 19/20*       (2011.01)
  *G06T 7/33*        (2017.01)
  *G06T 7/38*        (2017.01)
(52) U.S. Cl.
  CPC ................ *G06T 19/20* (2013.01); *G06T 7/33* (2017.01); *G06T 7/38* (2017.01);
        (Continued)

(58) Field of Classification Search
  CPC ..... G06V 10/20; G06V 10/7788; G06V 20/70
  See application file for complete search history.

(56) References Cited

U.S. PATENT DOCUMENTS 10,936,902 B1 *   3/2021   Bagwell .................... G06T 7/73
11,804,042 B1 *  10/2023   Alokhina ............. G06V 10/776
          (Continued)

OTHER PUBLICATIONS

Tan et al, 3-D Object Detection for Multiframe 4-D Automotive Millimeter-Wave Radar Point Cloud, IEEE Sensors Journal, vol. 23, No. 11, Jun. 1, 2023, pp. 11125-11138, doi: 10.1109/JSEN.2022. 3219643.*

(Continued)

*Primary Examiner* — Guillermo M Rivera-Martinez
(74) *Attorney, Agent, or Firm* — Hawaii Patent Services; Nathaniel K. Fedde; Kenton N. Fedde

(57)          ABSTRACT

Disclosed is interactive labeling of a 4D dynamic object based on time series data, which aims at time series-related point cloud dynamic object data. Multi-frame local point clouds in the same time series are transformed into the same global coordinate system with corresponding poses to obtain global point clouds in the same time series are obtained, which clearly shows the moving trajectory of the dynamic object. Taggers can label key 3D boxes based on the moving trajectory of the dynamic object, and automatically generate 3D prediction boxes of other frames based on these key 3D boxes, which significantly reduces the number of frames that need manual operation and solves the problem that 3D prediction boxes generated based on deep learning model are inaccurate and efficiency can hardly be improved.

19 Claims, 3 Drawing Sheets

(52) U.S. Cl.
CPC .............. *G06T 2207/10016* (2013.01); *G06T 2207/30241* (2013.01); *G06T 2210/12* (2013.01); *G06T 2210/56* (2013.01); *G06T 2219/004* (2013.01); *G06T 2219/2016* (2013.01)

(56) References Cited

U.S. PATENT DOCUMENTS

| | | | | |
|---|---|---|---|---|
| 2018/0108146 A1* | 4/2018 | Zhan | ................... | G06V 40/161 |
| 2021/0027546 A1* | 1/2021 | Hao | ........................ | G06T 19/20 |
| 2021/0365712 A1* | 11/2021 | Lu | ......................... | G01S 7/4802 |
| 2022/0051431 A1* | 2/2022 | Jagadeesan | ............ | G06V 10/98 |
| 2022/0066456 A1* | 3/2022 | Ebrahimi Afrouzi | ........................ | G06F 3/04883 |
| 2022/0187841 A1* | 6/2022 | Ebrahimi Afrouzi | ........................ | G05D 1/0274 |
| 2022/0301192 A1* | 9/2022 | Boardman | .............. | G06T 7/579 |
| 2022/0343101 A1* | 10/2022 | Chang | ................... | G01S 17/86 |

OTHER PUBLICATIONS

Hi et al., Learning Scene Dynamics from Point Cloud Sequences, Jan. 23, 2022, International Journal of Computer Vision (2022) 130, pp. 669-695, arXiv:2111.08755.*

Keller et al., Real-Time 3D Reconstruction in Dynamic Scenes Using Point-Based Fusion, 2013 International Conference on 3D Vision—3DV 2013, Seattle, WA, USA, 2013, pp. 1-8, doi: 10.1109/3DV.2013.9.*

\* cited by examiner

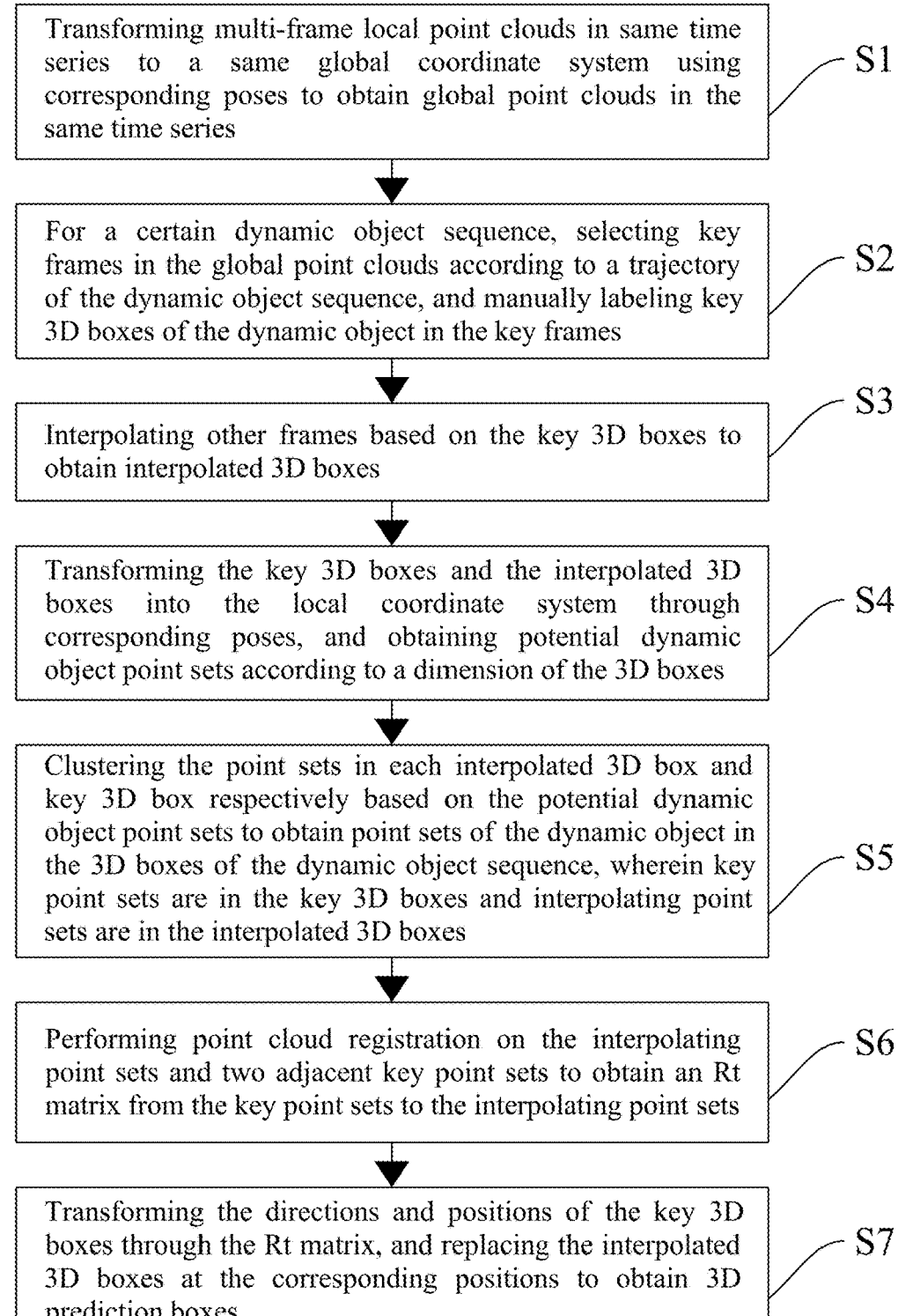

Transforming multi-frame local point clouds in same time series to a same global coordinate system using corresponding poses to obtain global point clouds in the same time series — S1

For a certain dynamic object sequence, selecting key frames in the global point clouds according to a trajectory of the dynamic object sequence, and manually labeling key 3D boxes of the dynamic object in the key frames — S2

Interpolating other frames based on the key 3D boxes to obtain interpolated 3D boxes — S3

Transforming the key 3D boxes and the interpolated 3D boxes into the local coordinate system through corresponding poses, and obtaining potential dynamic object point sets according to a dimension of the 3D boxes — S4

Clustering the point sets in each interpolated 3D box and key 3D box respectively based on the potential dynamic object point sets to obtain point sets of the dynamic object in the 3D boxes of the dynamic object sequence, wherein key point sets are in the key 3D boxes and interpolating point sets are in the interpolated 3D boxes — S5

Performing point cloud registration on the interpolating point sets and two adjacent key point sets to obtain an Rt matrix from the key point sets to the interpolating point sets — S6

Transforming the directions and positions of the key 3D boxes through the Rt matrix, and replacing the interpolated 3D boxes at the corresponding positions to obtain 3D prediction boxes — S7

FIG. 1

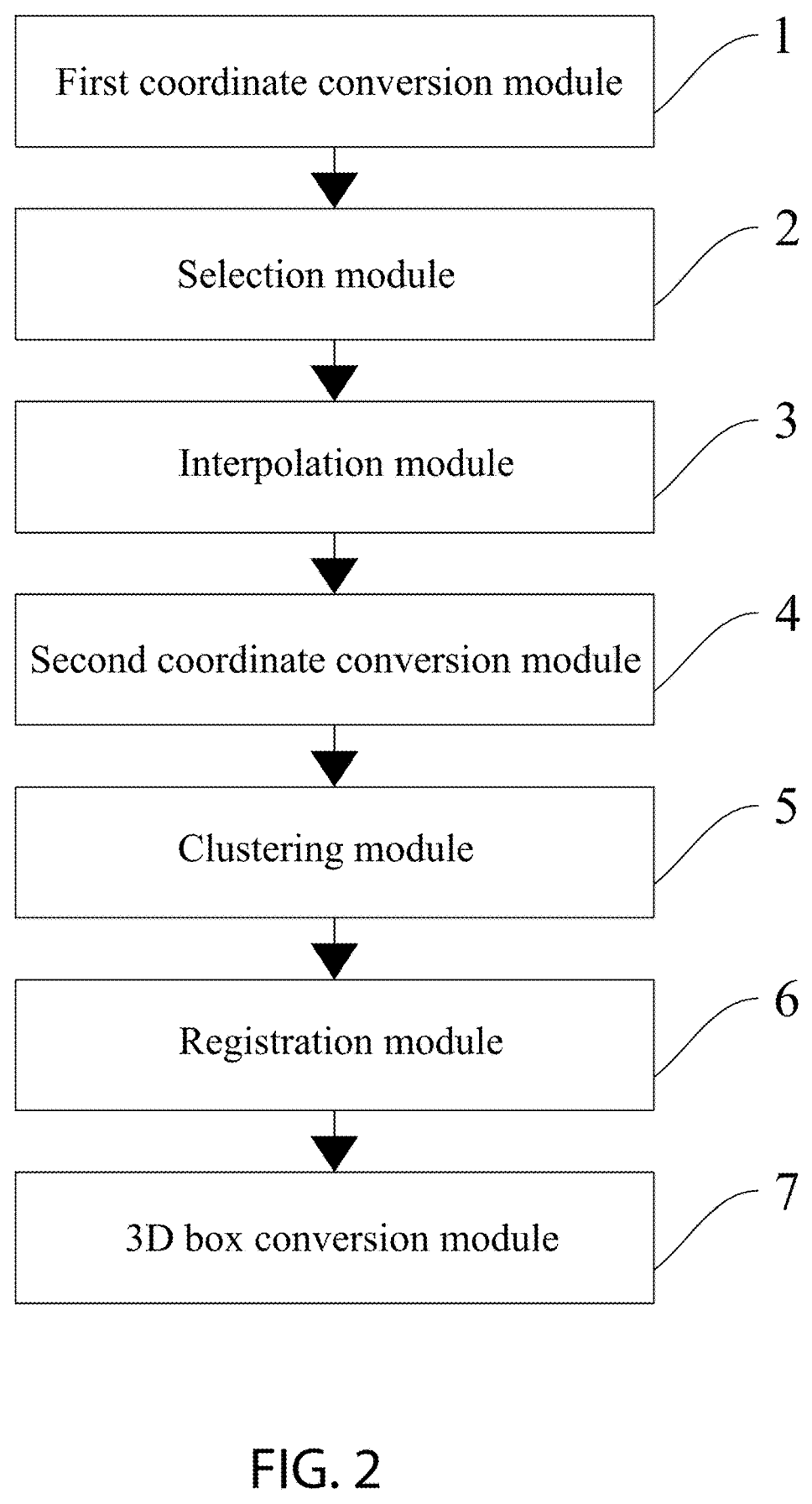

First coordinate conversion module — 1

Selection module — 2

Interpolation module — 3

Second coordinate conversion module — 4

Clustering module — 5

Registration module — 6

3D box conversion module — 7

FIG. 2

INTERACTIVE LABELING METHOD FOR 3D DYNAMIC OBJECT BASED ON TIME SERIES DATA, KEY FRAMES, AND INTERPOLATED FRAMES

CROSS-REFERENCE TO RELATED APPLICATIONS

This application claims the priority of China Patent Application No. 202411062156.2 filed on Aug. 5, 2024, which is entitled "INTERACTIVE LABELING METHOD AND DEVICE FOR 4D DYNAMIC OBJECT BASED ON TIME SERIES DATA", the entire contents of which, including the amendments therein, are all incorporated herein by reference.

Technical Field

The present invention relates to the technical field of data labeling, in particular to a method, a device and electronic equipment for interactive labeling of a 4D dynamic object based on time series data.

BACKGROUND

In the rapidly developing technical fields such as modern intelligent driving, robot navigation and virtual reality, accurate data labeling, especially the labeling of dynamic objects, becomes particularly important. The point cloud data obtained by sensors has become an important basis for studying the motion trajectory and behavior of dynamic objects because of its rich three-dimensional spatial information. However, due to the irregularity and high-dimensional characteristics of point cloud data, dynamic object labeling and tracking based on point cloud is still full of challenges.

For example, U.S. Pat. No. 11,004,234 discloses "Method and apparatus for annotating point cloud data", which uses lidar and non-lidar sensors to collect data in a given scene to obtain point cloud data and sensor data respectively, the point cloud data are segmented and tracked to obtain a segmentation and tracking result of the point cloud; the feature objects in the sensor data are identified and tracked to obtain the identification and tracking results of the feature objects; the results of feature object recognition and tracking are used to correct the segmentation and tracking results of point cloud, and the confidence of point cloud recognition and tracking results is obtained; the point cloud segmentation tracking result with confidence greater than the confidence threshold is determined as the point cloud labeling result.

In the past, people mainly studied the automatic labeling of point cloud dynamic objects by deep learning algorithm. However, due to the large differences in data fields of different point clouds, it often takes a lot of manpower and computing power to refine the model for a new batch of data in actual production, and the model training is out of line with data production, therefore it is impossible to effectively participate in data production.

For example, U.S. patent application publication No. US20210027546A1 discloses "TECHNIQUES FOR LABELING CUBOIDS IN POINT CLOUD DATA", which can automatically adjust the labeling of cuboids drawn by users in point cloud data to remove abnormal points, add relevant points and fit cuboids to points representing objects.

Interpolation and object tracking techniques for propagating cuboids from frames designated as key frames to other frames are also disclosed.

On the other hand, data labeling requires very high label quality. However, as in the solution disclosed above, the quality of the prediction box generated by the deep learning model often fails to meet the labeling requirements, and the labeller often needs to spend a lot of time to modify the prediction box, which may not improve or even reduce the efficiency.

According to the technical solution of this patent, by transforming multiple local point clouds in the same time series into the global coordinate system, and combining the methods of manual labeling and automatic interpolation, the number of frames requiring manual operation is significantly reduced, and the 3D box obtained by interpolation is further used to accurately locate the spatial position and trajectory of dynamic objects through point cloud clustering and registration technology, thus improving the efficiency and accuracy of labeling. This method can not only significantly reduce the labor intensity of point cloud labeling, but also provide more reliable data support in practical application.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides an interactive labeling method for a 4D dynamic object based on time series data, which includes the following steps:

a, comprising the following steps:

transforming multi-frame local point clouds in same time series to a same global coordinate system using corresponding poses to obtain global point clouds in the same time series;

for a certain dynamic object sequence, selecting key frames in the global point clouds according to a trajectory of the dynamic object sequence, and manually labeling key 3D boxes of the dynamic object in the key frames;

interpolating other frames based on the key 3D boxes to obtain interpolated 3D boxes;

transforming the key 3D boxes and the interpolated 3D boxes into the local coordinate system through corresponding poses, and obtaining potential dynamic object point sets according to a dimension of the 3D boxes;

clustering the point sets in each interpolated 3D box and key 3D box respectively based on the potential dynamic object point sets to obtain point sets of the dynamic object in the 3D boxes of the dynamic object sequence, wherein key point sets are in the key 3D boxes and interpolating point sets are in the interpolated 3D boxes;

performing point cloud registration on the interpolating point sets and two adjacent key point sets to obtain an Rt matrix from the key point sets to the interpolating point sets; and transforming the directions and positions of the key 3D boxes through the Rt matrix, and replacing the interpolated 3D boxes at the corresponding positions to obtain 3D prediction boxes;

wherein the step of performing point cloud registration on the interpolating point sets and two adjacent key point sets to obtain an Rt matrix from the key point sets to the interpolating point sets comprises:

computing the Rt matrix to the interpolated 3D boxes by using two adjacent key 3D boxes respectively to obtain two rough registration results;

using the rough registration results of two adjacent key frames as an initial transformation matrix, and constructing a residual and a Jacobian matrix by using the normal information of a nearest point;

constructing a least square problem based on the Jacobian matrix and solving a minimum residual;

updating the transformation matrix according to the solution, and performing a convergence test to finally obtain two fine registration results; and comparing the minimum residual values of the two fine registration cloud results, selecting the fine registration result with a smaller residual value as the Rt matrix from the key point sets to the interpolating point sets.

The present invention also provides a device for constructing and pre-labeling a 4D dynamic object based on time series data, which includes:

a first coordinate conversion module configured for transforming multi-frame local point clouds in same time series to a same global coordinate system using corresponding poses to obtain global point clouds in the same time series;

a selection module configured for selecting key frames in the global point clouds for a certain dynamic object sequence according to a trajectory of the dynamic object sequence, and manually labeling key 3D boxes of the dynamic object in the key frames;

an interpolation module configured for interpolating other frames based on the key 3D boxes to obtain interpolated 3D boxes;

a second coordinate conversion module configured for transforming the key 3D boxes and the interpolated 3D boxes into the local coordinate system through corresponding poses, and obtaining potential dynamic object point sets according to a dimension of the 3D boxes;

a clustering module configured for clustering the point sets in each interpolated 3D box and key 3D box respectively based on the potential dynamic object point sets to obtain point sets of the dynamic object in the 3D boxes of the dynamic object sequence, wherein key point sets are in the key 3D boxes and interpolating point sets are in the interpolated 3D boxes;

a registration module configured for performing point cloud registration on the interpolating point sets and two adjacent key point sets to obtain an Rt matrix from the key point sets to the interpolating point sets; and a 3D box conversion module configured for transforming the directions and positions of the key 3D boxes through the Rt matrix, and replacing the interpolated 3D boxes at the corresponding positions to obtain 3D prediction boxes;

wherein the step of performing point cloud registration on the interpolating point sets and two adjacent key point sets to obtain an Rt matrix from the key point sets to the interpolating point sets comprises:

computing the Rt matrix to the interpolated 3D boxes by using two adjacent key 3D boxes respectively to obtain two rough registration results;

using the rough registration results of two adjacent key frames as an initial transformation matrix, and constructing a residual and a Jacobian matrix by using the normal information of a nearest point;

constructing a least square problem based on the Jacobian matrix and solving a minimum residual;

updating the transformation matrix according to the solution, and performing a convergence test to finally obtain two fine registration results; and comparing the minimum residual values of the two fine registration cloud results, selecting the fine registration result with a smaller residual value as the Rt matrix from the key point sets to the interpolating point sets.

The present invention further provides electronic equipment for interactive labeling of 4D dynamic objects based on time series data, which includes one or more processors, one or more computer readable storage devices, and program instructions stored on at least one of the one or more computer readable storage devices for execution by at least one of the one or more processors, the program instructions executable to:

transforming multi-frame local point clouds in same time series to a same global coordinate system using corresponding poses to obtain global point clouds in the same time series;

for a certain dynamic object sequence, key frames in the global point clouds are selected according to a trajectory of the dynamic object sequence, and key 3D boxes of the dynamic object are manually labeled in the key frames;

other frames are interpolated based on the key 3D boxes to obtain interpolated 3D boxes;

the key 3D boxes and the interpolated 3D boxes are transformed into the local coordinate system through corresponding poses, and potential dynamic object point sets are obtained according to a dimension of the 3D boxes;

the point sets in each interpolated 3D box and key 3D box are clustered respectively based on the potential dynamic object point sets to obtain point sets of the dynamic object in the 3D boxes of the dynamic object sequence, wherein key point sets are in the key 3D boxes and interpolating point sets are in the interpolated 3D boxes;

point cloud registration is performed on the interpolating point sets and two adjacent key point sets to obtain an Rt matrix from the key point sets to the interpolating point sets; and the directions and positions of the key 3D boxes are transformed through the Rt matrix, and the interpolated 3D boxes at the corresponding positions are replaced to obtain 3D prediction boxes;

wherein the step of performing point cloud registration on the interpolating point sets and two adjacent key point sets to obtain an Rt matrix from the key point sets to the interpolating point sets comprises:

computing the Rt matrix to the interpolated 3D boxes by using two adjacent key 3D boxes respectively to obtain two rough registration results;

using the rough registration results of two adjacent key frames as an initial transformation matrix, and constructing a residual and a Jacobian matrix by using the normal information of a nearest point;

constructing a least square problem based on the Jacobian matrix and solving a minimum residual;

updating the transformation matrix according to the solution, and performing a convergence test to finally obtain two fine registration results; and comparing the minimum residual values of the two fine registration cloud results, selecting the fine registration result with a smaller residual value as the Rt matrix from the key point sets to the interpolating point sets.

BRIEF DESCRIPTION OF DRAWINGS

In order to explain the technical solution of the present invention more clearly, the drawings needed in the implementation will be briefly introduced below. Obviously, the drawings in the following description are only some embodiments of the present invention. For those skilled in the art, other drawings can be obtained according to these drawings without creative work.

FIG. 1 is a flowchart of an interactive labeling method for a 4D dynamic object based on time series data according to an exemplary embodiment.

FIG. 2 is a block diagram of a 4D dynamic interactive labeling device based on time series data according to an exemplary embodiment.

DESCRIPTION OF EMBODIMENTS

Figure 3:
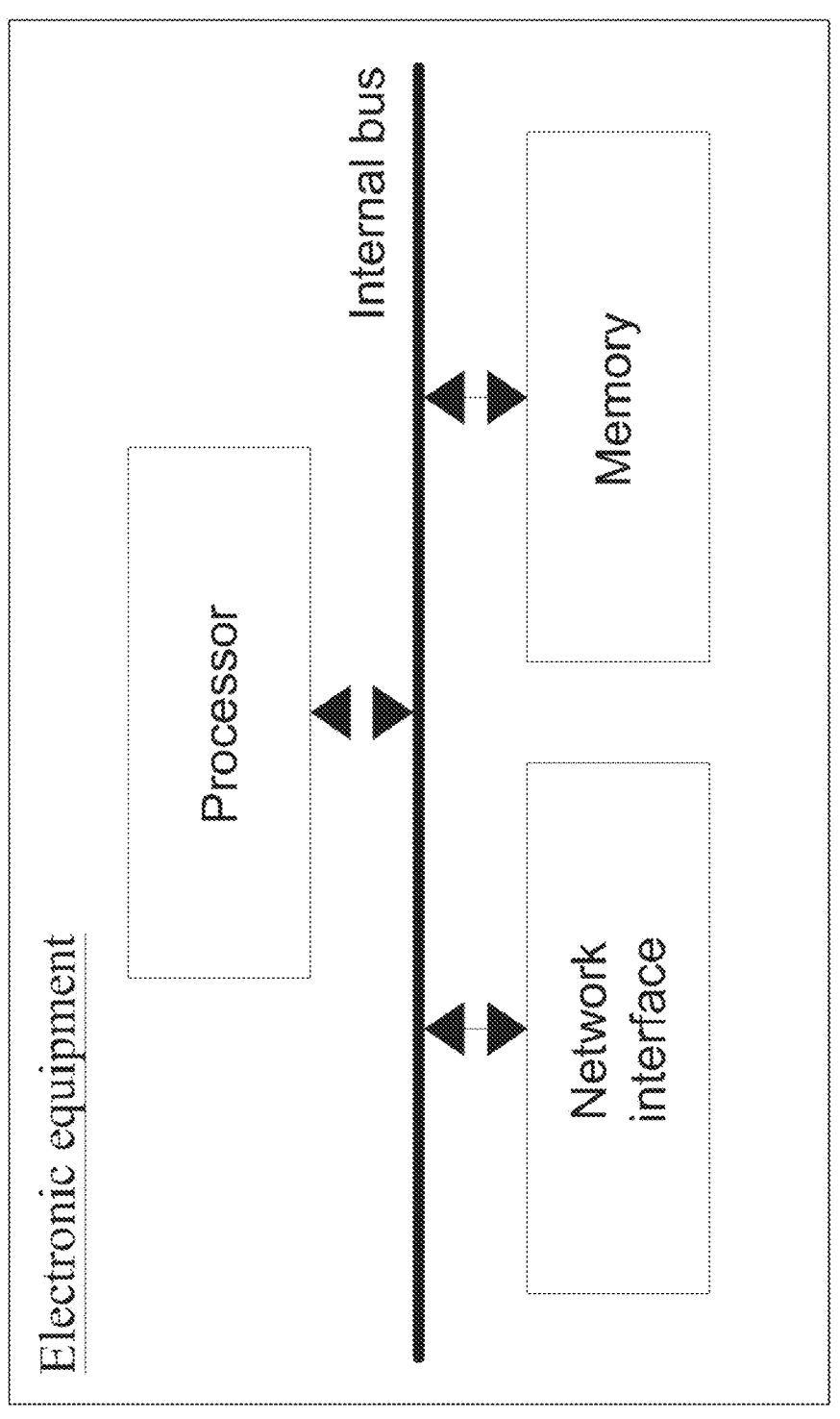
FIG. 3 is a block diagram of electronic equipment according to an exemplary embodiment.

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

FIG. 1 is a flowchart of an interactive labeling method for a 4D dynamic object based on time series data according to an exemplary embodiment. Referring to FIG. 1, an interactive labeling method for a 4D dynamic object based on time series data provided by an embodiment of the present invention may include:

S1, multi-frame local point clouds in same time series are transformed to a same global coordinate system using corresponding poses to obtain global point clouds in the same time series.

Specifically, the multi-frame local point clouds in the same time series refers to the multi-frame point clouds obtained from the point cloud data continuously collected by radar sensors in the same time interval after frame cutting and distortion removal.

Poses are obtained by sensors such as GPS, IMU, wheel speedometer, lidar and camera, in which GPS provides position information, IMU measures attitude change, wheel speedometer estimates vehicle driving distance, and lidar and camera infer displacement and attitude through scanning and image processing. In order to improve the positioning accuracy and robustness, Kalman filter is used to comprehensively process the information from multiple sensors, so as to accurately record the pose of each frame of point cloud.

For each frame of the pose, it consists of a rotation matrix R and a translation vector t:

$$R =: \begin{bmatrix} R_{11} & R_{12} & R_{13} \\ R_{21} & R_{22} & R_{23} \\ R_{31} & R_{32} & R_{33} \end{bmatrix}$$

$$t = \begin{bmatrix} t_1 & t_2 & t_3 \end{bmatrix}$$

The local point clouds are transformed by the rotation matrix R and translation vector t to obtain global point clouds;

$$P_{global} = R \times P_{local} + t$$

where $P_{global}$ is the coordinate point in the global coordinate system and $P_{local}$ is the coordinate point in the local coordinate system.

In some embodiments, different types of sensor data (such as RGB images, depth images, lidar point clouds, etc.) can be combined for data fusion through multimodal learning methods. Using the advantages of different sensors, the accuracy of dynamic object recognition and labeling is improved. For example, depth data can provide spatial information of objects, while RGB images can provide color and texture information.

S2, for a certain dynamic object sequence, key frames in the global point clouds are selected according to a trajectory of the dynamic object sequence, and key 3D boxes of the dynamic object are manually labeled in the key frames;

Specifically, dynamic object may have the following two motion modes according to the running trajectories:

Mode 1: Linear Motion Mode

Specifically, if the trajectory of the dynamic object is linear, the labeller only needs to select the first frame and the last frame as key frames.

Mode 2: Nonlinear Motion Mode

Specifically, if the trajectory of a dynamic object is nonlinear, the labeller needs to select not only the first frame and the last frame as key frames, but also the arc midpoint of the trajectory as key frames.

After selecting the key frame, the labeller labels the 3D boxes based on the shape of the dynamic object sequence in this frame, ensuring that the position, dimension and direction of the 3D box fit the dynamic object, thereby obtaining the key 3D boxes.

In some embodiments, for key frame selection, key frames may be adaptively selected according to the moving speed and changing characteristics of the dynamic object. A threshold can be set, and when the motion change of the object exceeds the threshold, the current frame is automatically selected as the key frame. Unnecessary manual intervention is reduced and the efficiency and accuracy of key frame selection are improved.

S3, other frames are interpolated based on the key 3D boxes to obtain interpolated 3D boxes.

Specifically, a 3D box (including key 3D boxes and interpolated 3D boxes) consist of three parts: position, direction and dimension.

(1) Position Interpolation:

Specifically, due to the lack of data points, the whole data sequence is discontinuous, which will lead to inaccurate fitting of the target trajectory. The interpolation of the 3D box position can be divided into the following sub-steps:

A1: linear interpolation is used to compensate the missing ordinary frame. For the trajectory T, the trajectory boxes at time $t_1$ and time $t_2$ are given, and linear interpolation of the trajectory is performed at time t. The interpolation box result of the trajectory T can be calculated by Formula 1:

$$b_t = b_{t_1} + \left(b_{t_2} - b_{t_1}\right)\frac{t - t_1}{t - t_2}$$

wherein, $b_t$ represents an interpolation box at time t, $b_{t_1}$ represents a key 3D box at time $t_1$, and $b_{t_2}$ represents a key 3D box at time $t_2$, and $t_1 < t < t_2$.

In a single motion mode, linear interpolation is simple and efficient, and it can quickly locate the possible position of the 3D box within the allowable error range, ensuring the operation efficiency and getting good accuracy.

A2: after obtaining the linear interpolation result, Gaussian process regression is used to model the nonlinear motion of the trajectory. The Gaussian smooth interpolation model of the trajectory T is as follows:

$$b_t = f(t) + \varepsilon$$

wherein, $t \in F$ represents the frame number, $b_t \in B$ represents a position coordinate variable at the $t^{th}$ frame (i.e., x, y, z, l, w, h), B represents all 3D boxes in the sequence, and $\varepsilon \sim N(0, \sigma^2)$ represents Gaussian noise. Given a linear interpolation trajectory with a length l, the nonlinear motion modeling problem is solved by a fitting function $f$. It is assumed that it obeys a Gaussian distribution:

$$f(t) \in GP(0, k(x, x'))$$

where $$k(x, x') = \exp\left(-\frac{\|x - x'\|^2}{2\lambda^2}\right)$$

is a radial basis kernel function. According to the properties of Gaussian process, a new prediction set F* is given, and its smoothed position B* can be predicted by the following formula:

$$B^* = K(F^*, F)(K(F, F) + \sigma^2 I)^{-1} B$$

where K(•,•) is a covariance function based on k(•,•). In addition, the hyperparameter $\lambda$ controls the smoothness of the trajectory, and it simply be set as a function suitable for the interpolation length l, as shown in the following formula:

$$\lambda = \log(2l^2/\tau)$$

wherein, $\tau$ is set as 10 according to the experimental results.

By correcting the data missing problem of Gaussian process regression, Gaussian process regression can achieve more accurate trajectory fitting for linear interpolation in the case of nonlinear trajectory.

Although linear interpolation is simple and efficient, it lacks motion information, which restricts the 3D box from returning to the exact position. Gaussian process can estimate the uncertainty of linear interpolation results to adapt to the complex data distribution.

(2) Direction Interpolation:

Specifically, even if the dynamic object is doing nonlinear motion, it is necessary to provide constant-speed interpolation. The directional interpolation of the 3D box can be divided into the following sub-steps:

B1, quaternions of two key 3D box directions are determined;

$$(q_1, q_2)$$

where q represents a quaternion in the direction of a 3D box, and the subscript represents the index of the key 3D box.

B2: dot product is performed for the quaternion in the key 3D box direction;

$$\theta = \cos(\theta) = q_1 \cdot q_2$$

B3, the actual included angle is calculated by using the inverse cosine;

$$\theta = \arccos(\cos(\theta))$$

B4, a direction interpolation result is calculated;

$$q(t) = \frac{\sin((1 - t) \cdot \theta) \cdot q_1 + \sin(t \cdot \theta) \cdot q_2}{\sin(\theta)}$$

where t is an interpolation parameter between 0 and 1, indicating the interpolation position of the 3D box.

Through these steps, the direction can be ensured to change at a constant speed. Because the direction change of dynamic objects in the real world is smooth, the direction interpolation solution can meet the direction change of the dynamic object in the real world.

(3) Dimension Inheritance:

Specifically, the application scene of the present invention is mainly but not limited to road dynamic object labeling, and the dimension of the dynamic object will not change, therefore the dimension of the interpolated 3D box is inherited from the key 3D box.

Different interpolation solutions are applied to different attributes of 3D boxes based on their characteristics, which effectively improves the accuracy of interpolating 3D boxes and provides more robust data information for subsequent data processing.

S4, the key 3D boxes and the interpolated 3D boxes are transformed into the local coordinate system through corresponding poses, and potential dynamic object point sets are obtained according to a dimension of the 3D boxes.

Specifically, the key 3D boxes and the interpolated 3D boxes are located in the global coordinate system, and the specific formula for transforming to the local coordinate system through the corresponding pose is as follows:

$$P_{local} = R^{-1} \times (P_{global} - t)$$

where $R^{-1}$ is the inverse matrix of the rotation matrix R.

Because the interpolated 3D box may not completely contain the dynamic object point set, the potential dynamic object point set of the dynamic object can be obtained by enlarging the dimension of the interpolated 3D box twice after transforming to local coordinates.

In the global coordinate system, there is dynamic object information of each frame of point cloud, and the trajectories of different dynamic objects will overlap in the global coordinate system, therefore it is impossible to distinguish the dynamic object point sets. Therefore, the key 3D box and the interpolated 3D box are transformed to the local coordinate system through the corresponding poses, which eliminates the influence brought by the trajectories of different dynamic objects. Expanding the dimension of the interpolated 3D box after the transform to the local coordinate system can ensure that the point sets of dynamic objects are in the 3D box as much as possible.

S5, the point sets in each interpolated 3D box and key 3D box are clustered respectively based on the potential dynamic object point sets to obtain point sets of the dynamic object in the 3D boxes of the dynamic object sequence, wherein key point sets are in the key 3D boxes and interpolating point sets are in the interpolated 3D boxes.

Specifically, the domain radius r and the minimum number of points minPts are set as the initial parameters of clustering, and clustering is performed according to the following steps:

C1: identifying the core point: for each point in the data set, the number of its neighbor points within the range of r is calculated; if the number of neighbor points of a point are greater than or equal to minPts, then the point is labeled as a core point.

C2: extended clustering: an un-accessed core point is selected, a new cluster is created and labeled as accessed, and all points in the r-neighborhood of the core point are added to the cluster; for each point in the cluster, if it is an un-accessed core point, the points in its r-neighborhood are added to the cluster, and this process is repeated until no more points can be added to the current cluster.

C3: dealing with boundary points and noise points: if a point is neither a core point nor is in the r-neighborhood of a certain core point, then it is labeled as a noise point; if a point is in the r-neighborhood of a core point, but it is not a core point, this point is called a boundary point, and the boundary point belongs to the corresponding cluster.

C4: outputting clustering results: the above steps are repeated until all points are processed, finally a plurality of clusters in the potential dynamic object point set is output, and the cluster with the largest number of points is selected as the point set of dynamic objects.

Through clustering, more accurate dynamic object point sets can be obtained, and the accuracy of subsequent point cloud registration can be improved.

S6, point cloud registration is performed on the interpolating point sets and two adjacent key point sets to obtain an Rt matrix from the key point sets to the interpolating point sets; and Specifically, the interpolating point set is more similar to its adjacent key point set, therefore the interpolating point set and its adjacent key point set are subjected to point cloud registration to reduce the time complexity. The point cloud registration steps are as follows:

D1: coarse registration: two Rt matrices from the key 3D box to the interpolated 3D box are calculated according to [x, y, z, r, p, y] of the interpolated 3D box and two adjacent key 3D boxes, where [x, y, z] is the coordinate of the center point of the 3D box and [r, p, y] is the rotation angle of the 3D box, and the specific calculation method is as follows:

[r, p, y] is converted into a rotation matrix:

$$R =; \begin{bmatrix} R_{11} & R_{12} & R_{13} \\ R_{21} & R_{22} & R_{23} \\ R_{31} & R_{32} & R_{33} \end{bmatrix}$$

It is combined with [x, y, z] into a transformation matrix T:

$$T =; \begin{bmatrix} R_{11} & R_{12} & R_{13} & t_1 \\ R_{21} & R_{22} & R_{23} & t_2 \\ R_{31} & R_{32} & R_{33} & t_3 \\ 0 & 0 & 0 & 1 \end{bmatrix}$$

A transformation matrix from a key 3D box to an interpolated 3D box is calculated;

$$T_{b-t} = T_b^{-1} \cdot T_t$$

wherein $T_b^{-1}$ represents the inverse matrix of a transformation matrix of the key 3D box, and $T_t$ represents a transformation matrix of the interpolated 3D box.

D2: Fine registration:

D21, the transformation matrix obtained by rough registration is taken as an initial transformation matrix;

D22: for each source point $p_i \in P$, the nearest point $q_j$ is found in the target point cloud Q and the corresponding normal n; is recorded;

D23: a linear equation is constructed with the normal information of the nearest point to optimize the transformation matrix; first, a residual is constructed, which is defined as the distance between the source point and the target point in the normal direction, namely:

$$r_i = \left( q_j + n_j^T (q_i - q_j) - p_i \right) \cdot n_j$$

which is simplified as follows:

$$r_i = (q_j - p_i) \cdot n_j$$

where $n_j$ is the normal vector of the nearest point $q_j$, and represents the transposition of the normal vector.

Then the Jacobian matrix is constructed, and it is assumed that pi=(pix, $p_{iy}$, $p_{iz}$) and qj=(qjx, $q_{jy}$, $q_{jz}$), the transformation matrix T can be decomposed into rotation R and translation t, and the small disturbance matrix δT needs to be estimated, in which the rotation part R can be represented by a rotation vector. Let the small disturbance be δθ and δt, and the Jacobian matrix $J_i$ is approximated as:

$$J_i = \left[\left(n_j^T R[p_i]_x\right), n_j^T\right]$$

where $[p_i]_x$ is the antisymmetric matrix of $p_i$.

D3: a least square problem is constructed, and the residual is minimized by solving the following linear equation:

$$A\delta x = b$$

where $$A = \sum_i J_i^T J_i, \, b = \sum_i J_i^T r_i, \, \delta x = [\delta\theta, \delta t].$$

D4: the transformation matrix T is updated $$R \leftarrow R \cdot \exp([\delta\theta]_x)$$

$$t \leftarrow t + \delta t$$

where $\exp([\delta\theta]_x)$ is a minute rotation expressed in the form of an antisymmetric matrix.

D5: convergence test, that is, whether the variation of the transformation is small enough or reaches the maximum number of iterations is checked, if it converges, the iteration is terminated, otherwise return to D22;

D6: the result is output, and the final transformation matrix $T_f$(Rt) is the optimal registration transformation from the origin cloud P to the target point cloud Q, that is, the Rt matrix from the key point set to the interpolating point set.

In the process of point cloud registration, the Rt matrix from the key 3D box to the interpolated 3D box is used as the rough registration result, which accelerates the convergence speed of point cloud registration and improves the registration accuracy. In the process of constructing the linear equation with the normal information of the nearest point, a residual is constructed, which is defined as the distance between the source point and the target point in the normal direction, that is, the distance between the source point and the target point in the plane, which improves the geometric understanding of the algorithm. The surface of point cloud data can usually be approximated by a plane or a curved surface, therefore the distance measurement based on the surface is closer to the actual geometric shape of the data, which makes the point cloud registration more physically meaningful when dealing with the actual scene data, and also makes the convergence speed faster and the accuracy higher.

S7, the directions and positions of the key 3D boxes are transformed through the Rt matrix, and the interpolated 3D boxes at the corresponding positions are replaced to obtain 3D prediction boxes.

Specifically, the transformation mode is as follows:

$$T_p = T_f \cdot T_b$$

wherein, $T_p$ is the result of transforming the transformation matrix of the key 3D box through the Rt matrix, which includes a rotation matrix R and a translation vector t, the rotation matrix R is transformed into Euler angles [r, p, y], the translation vector t is transformed into coordinates [x, y, z], and the dimensions inherited from the key 3D box are added to obtain the 3D prediction box.

The 3D prediction box is obtained by transforming the key 3D box according to the Rt matrix, and the accurate Rt matrix has been obtained in the previous step, which can accurately transform the position and direction of the key 3D box and provide an accurate 3D prediction box for the final result.

Corresponding to the aforementioned embodiment of the interactive labeling method for a 4D dynamic object based on time series data, the present invention also provides an embodiment of an interactive labeling device for a 4D dynamic object based on time series data.

In addition, the present invention can also be applied to:

Point cloud processing based on deep learning; the implementation mode is: a deep learning model (such as PointNet, PointCNN, etc.) is used to extract and classify features of point cloud data, and dynamic objects are automatically identified; the deep learning model can automatically learn features, reduce the need for manual feature engineering, and improve the accuracy of dynamic object identification;

Augmented reality (AR) assisted labeling; the implementation mode is: by using augmented reality technology, virtual information is superimposed on the actual scene to assist manual labeling of 3D boxes of dynamic objects; through AR technology, the labeller can understand the position and trajectory of dynamic objects more intuitively, and improve the accuracy and efficiency of labeling;

Feedback mechanism and online learning: a feedback mechanism is established, allowing the labeller to correct the automatic labeling results, and feed these corrections back to the model for online learning; through continuous feedback and learning, the model can gradually improve the accuracy of labeling and adapt to the characteristics of different scenes and dynamic objects;

Motion prediction and trajectory analysis: on the basis of dynamic object labeling, a motion prediction module is added to analyze the motion trajectory of dynamic objects and predict their future positions; through motion prediction, 3D prediction boxes can be generated in advance, the labeling process of subsequent frames can be optimized, and the real-time performance of labeling can be improved;

Evaluation and optimization of results: systematic evaluation mechanism is established, labeling results are regularly evaluated, errors and deficiencies in labeling are identified, and targeted optimization is performed; the long-term effectiveness and accuracy of labeling system is ensured through continuous evaluation and optimization.

Compared with the existing labeling methods, the present invention improves the labeling accuracy, and can generate the 3D box of the dynamic object more accurately by combining the manual labeling and the automatic interpolation method, thus reducing the error of the prediction box generated based on the deep learning model, thereby improving the labeling accuracy.

This method significantly reduces the number of frames that need manual intervention. By selecting and interpolating key frames to generate 3D prediction boxes of other frames, the labeller can concentrate on the labeling of key frames, which reduces the labor intensity.

Using the characteristics of time series data, the labeling box of dynamic objects can be generated quickly, which reduces the time required for labeling. Through automatic interpolation and clustering technology, large-scale data labeling can be completed in a short time.

This method can adapt to the characteristics of different scenes and dynamic objects, and shows better flexibility and robustness especially when dealing with irregular and high-dimensional point cloud dat.

In the prior art, deep learning models often need a lot of labeled data for training, and the migration ability between different data domains is poor. By combining the traditional labeling method and automation technology, the present invention reduces the dependence on the deep learning model and reduces the disconnection problem between model training and data production.

Accurate dynamic object labeling can provide more reliable data support for subsequent applications such as intelligent driving, robot navigation and virtual reality, and improve the overall performance and security of the system.

FIG. 2 is a block diagram of a 4D dynamic interactive labeling device based on time series data according to an exemplary embodiment. Referring to FIG. 2, the apparatus includes:

a first coordinate conversion module 1 used for transforming multi-frame local point clouds in same time series to a same global coordinate system using corresponding poses to obtain global point clouds in the same time series;

a selection module 2 used for selecting key frames in the global point clouds for a certain dynamic object sequence according to a trajectory of the dynamic object sequence, and manually labeling key 3D boxes of the dynamic object in the key frames;

an interpolation module 3 used for interpolating other frames based on the key 3D boxes to obtain interpolated 3D boxes;

a second coordinate conversion module 4 used for transforming the key 3D boxes and the interpolated 3D boxes into the local coordinate system through corresponding poses, and obtaining potential dynamic object point sets according to a dimension of the 3D boxes;

a clustering module 5 used for clustering the point sets in each interpolated 3D box and key 3D box respectively based on the potential dynamic object point sets to obtain point sets of the dynamic object in the 3D boxes of the dynamic object sequence, wherein key point sets are in the key 3D boxes and interpolating point sets are in the interpolated 3D boxes;

a registration module 6 used for performing point cloud registration on the interpolating point sets and two adjacent key point sets to obtain an Rt matrix from the key point sets to the interpolating point sets; and a 3D box conversion module 7 used for transforming the directions and positions of the key 3D boxes through the Rt matrix, and replacing the interpolated 3D boxes at the corresponding positions to obtain 3D prediction boxes.

The selection module 2 is used for selecting a first frame, a last frame and a trajectory midpoint as the key frames according to the trajectory of the dynamic object in global coordinates.

The interpolation module 3 is used for performing spherical linear interpolation on the directions of interpolated 3D boxes of other frames based on the key 3D boxes, and performing Gaussian smooth interpolation on the positions thereof, and the dimension being inherited from the key 3D boxes.

The second coordinate conversion module 4 is used for multiplying the key 3D boxes and the interpolated 3D boxes by an inverse of a pose matrix to obtain the key 3D boxes and the interpolated 3D boxes in the local coordinate system; and enlarging the dimensions of the key 3D boxes and the interpolated 3D boxes in the local coordinate system, wherein the point sets are used as the potential dynamic object point sets.

The clustering module 5 is used for clustering the point sets in each interpolated 3D box and key 3D box to obtain multi-cluster point sets, and taking a cluster point set with most points as the point set of the dynamic object in the 3D boxes of the dynamic object sequence.

The registration module 6 is used for computing the Rt matrix to the interpolated 3D boxes by using of two adjacent key 3D boxes respectively to obtain two rough registration results;

performing point cloud registration on the interpolating point sets with the two adjacent key point sets based on the two rough registration results respectively to obtain two fine registration results; and selecting a fine registration result with a highest score as the Rt matrix from the key point sets to the interpolating point sets.

The 3D box conversion module 7 is used for performing corresponding rotation on the key 3D boxes by using a rotation matrix R, and performing corresponding translation on key 3D boxes by using a translation vector t to obtain the 3D prediction boxes at the corresponding positions, wherein the Rt matrix comprises the rotation matrix R and the translation vector t.

Correspondingly, the present invention also provides an electronic equipment, which includes one or more processors; a memory for storing one or more programs; when executed by the one or more processors, the one or more processors can realize the interactive labeling method for a 4D dynamic object based on time series data as described above. As shown in FIG. 3, it is a hardware structure diagram of any equipment with data processing capability where an interactive labeling device for a 4D dynamic object based on time series data provided by the embodiment of the present invention is located. In addition to the processor and memory shown in FIG. 3, any equipment with data processing capability where the device is located in the embodiment can usually include other hardware according to the actual functions of the equipment with data processing capability, which will not be described here again.

Correspondingly, the present invention further provides a computer-readable storage medium, on which computer instructions are stored, which, when executed by a processor, realize the above-mentioned interactive labeling method for a 4D dynamic object based on time series data. The computer-readable storage medium can be an internal storage unit of any device with data processing capability as described in any of the previous embodiments, such as a hard disk or a memory. The computer-readable storage medium can also be an external storage device of the wind turbine, such as a plug-in hard disk, Smart Media Card (SMC), SD card, Flash Card, and the like provided on the device. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

Aiming at the point cloud dynamic object data related to time series, the present invention transforms a plurality of frames of local point clouds in the same time series into the same global coordinate system by using the corresponding poses to obtain the global point clouds in the same time series, so that the moving trajectory of the dynamic object is clearly displayed; the labeller can label key 3D boxes based on the moving trajectory of the dynamic object, and automatically generate 3D prediction boxes of other frames based on these key 3D boxes, so that the number of frames requiring manual operation is significantly reduced, and the problem that the 3D prediction boxes generated based on the deep learning model are inaccurate and difficult to improve efficiency is solved.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An interactive labeling method, comprising the following steps:

transforming multi-frame local point clouds in same time series to a same global coordinate system using corresponding poses in the multi-frame local point clouds to obtain global point clouds in the same time series;

for a certain dynamic object sequence, selecting key frames in the global point clouds according to a trajectory of the dynamic object sequence, and manually labeling key three-dimensional ('3D') boxes of the dynamic object in the key frames;

interpolating other frames based on the key 3D boxes to obtain interpolated 3D boxes, wherein the other frames are frames other than the selected key frames;

transforming the key 3D boxes and the interpolated 3D boxes into a local coordinate system through corresponding poses of the key 3D boxes and the interpolated 3D boxes, and obtaining potential point sets of the dynamic object ('POTENTIAL DYNAMIC OBJECT POINT SETS') according to a dimension of the key 3D boxes and the interpolated 3D boxes;

clustering point sets in each of the interpolated 3D boxes ('INTERPOLATING POINT SETS') and point sets in each of the key 3D boxes ('KEY POINT SETS') respectively based on the POTENTIAL DYNAMIC OBJECT POINT SETS to obtain point sets of the dynamic object in the key 3D boxes and the interpolated 3D boxes of the dynamic object sequence;

performing point cloud registration on the INTERPOLATING POINT SETS and two of the KEY POINT SETS that are adjacent to the INTERPOLATING POINT SETS ('TWO ADJACENT KEY POINT SETS') to obtain an Rt matrix from the KEY POINT SETS to the INTERPOLATING POINT SETS; and transforming directions and positions of the key 3D boxes through the Rt matrix, and replacing the interpolated 3D boxes at corresponding positions to obtain 3D prediction boxes;

wherein the step of performing point cloud registration on the INTERPOLATING POINT SETS and TWO ADJACENT KEY POINT SETS to obtain an Rt matrix from the KEY POINT SETS to the INTERPOLATING POINT SETS comprises:

computing the Rt matrix to the interpolated 3D boxes by using two adjacent key 3D boxes respectively to obtain two rough registration results;

using the rough registration results of two adjacent key frames as an initial transformation matrix, and constructing a residual and a Jacobian matrix by using normal information of a nearest point in an interpolating point set of the INTERPOLATING POINT SETS;

constructing a least square problem based on the Jacobian matrix and minimizing the residual by solving the least square problem;

updating the transformation matrix according to the solution, and performing a convergence test to finally obtain two fine registration results, wherein the step of performing a convergence test comprises testing whether variation of the updated transformation matrix is smaller than a threshold; and comparing minimum residual values of the two fine registration results, selecting a fine registration result of the two fine registration results with a smaller residual value as the Rt matrix from the KEY POINT SETS to the INTERPOLATING POINT SETS.

2. The interactive labeling method according to claim 1, wherein the step of selecting key frames in the global point clouds according to a trajectory of the dynamic object sequence comprises:

selecting a first frame, a last frame and a trajectory midpoint as the key frames according to the trajectory of the dynamic object in global coordinates.

3. The interactive labeling method according to claim 1, wherein the step of interpolating other frames based on the key 3D boxes to obtain interpolated 3D boxes comprises:

performing spherical linear interpolation on directions of interpolated 3D boxes of the other frames based on the key 3D boxes, and performing Gaussian smooth interpolation on positions thereof, the dimension being inherited from the key 3D boxes.

4. The interactive labeling method according to claim 1, wherein the step of transforming the key 3D boxes and the interpolated 3D boxes into the local coordinate system through corresponding poses, and obtaining POTENTIAL DYNAMIC OBJECT POINT SETS according to a dimension of the key 3D boxes and the interpolated 3D boxes comprises:

multiplying the key 3D boxes and the interpolated 3D boxes by an inverse of a pose matrix of a corresponding pose of the corresponding poses of the key 3D boxes and the interpolated 3D boxes to obtain the key 3D boxes and the interpolated 3D boxes in a local coordinate system; and enlarging the dimensions of the key 3D boxes and the interpolated 3D boxes in the local coordinate system, wherein point sets of the enlarged-dimension key 3D boxes and interpolated 3D boxes are used as the POTENTIAL DYNAMIC OBJECT POINT SETS.

5. The interactive labeling method according to claim 1, wherein the step of clustering the point sets in each interpolated 3D box and key 3D box respectively based on the POTENTIAL DYNAMIC OBJECT POINT SETS to obtain point sets of the dynamic object in the key 3D boxes and the interpolated 3D boxes of the dynamic object sequence comprises:

clustering the point sets in each interpolated 3D box and key 3D box to obtain multi-cluster point sets, and taking a cluster point set with most points as the point set of the dynamic object in the 3D boxes of the dynamic object sequence.

6. The interactive labeling method according to claim 1, wherein the step of transforming the directions and positions of the key 3D boxes through the Rt matrix, and replacing the interpolated 3D boxes at the corresponding positions to obtain 3D prediction boxes comprises:

performing corresponding rotation on the key 3D boxes by using a rotation matrix R, and performing corresponding translation on key 3D boxes by using a translation vector t to obtain the 3D prediction boxes at the corresponding positions, wherein the Rt matrix comprises the rotation matrix R and the translation vector t.

7. A device comprising:

a first coordinate conversion module configured for transforming multi-frame local point clouds in same time series to a same global coordinate system using corresponding poses in the multi-frame local point clouds to obtain global point clouds in the same time series;

a selection module configured for selecting key frames in the global point clouds for a certain dynamic object sequence according to a trajectory of the dynamic object sequence, and manually labeling key three-dimensional ('3D') boxes of the dynamic object in the key frames;

an interpolation module configured for interpolating other frames based on the key 3D boxes to obtain interpolated 3D boxes, wherein the other frames are frames other than the selected key frames;

a second coordinate conversion module configured for transforming the key 3D boxes and the interpolated 3D boxes into a local coordinate system through corresponding poses of the key 3D boxes and the interpolated 3D boxes, and obtaining potential point sets of the dynamic object ('POTENTIAL DYNAMIC OBJECT POINT SETS') according to a dimension of the key 3D boxes and the interpolated 3D boxes;

a clustering module configured for clustering point sets in each the interpolated 3D boxes ('INTERPOLATING POINT SETS') and key 3D boxes ('KEY POINT SETS') respectively based on the POTENTIAL DYNAMIC OBJECT POINT SETS to obtain point sets of the dynamic object in the key 3D boxes and the interpolated 3D boxes of the dynamic object sequence;

a registration module configured for performing point cloud registration on the INTERPOLATING POINT SETS and two of the KEY POINT SETS that are adjacent to the INTERPOLATING POINT SETS ('TWO ADJACENT KEY POINT SETS') to obtain an Rt matrix from the KEY POINT SETS to the INTERPOLATING POINT SETS; and a 3D box conversion module configured for transforming directions and positions of the key 3D boxes through the Rt matrix, and replacing the interpolated 3D boxes at corresponding positions to obtain 3D prediction boxes;

wherein the function of performing point cloud registration on the INTERPOLATING POINT SETS and TWO ADJACENT KEY POINT SETS to obtain an Rt matrix from the KEY POINT SETS to the INTERPOLATING POINT SETS comprises:

computing the Rt matrix to the interpolated 3D boxes by using two adjacent key 3D boxes respectively to obtain two rough registration results;

using the rough registration results of two adjacent key frames as an initial transformation matrix, and constructing a residual and a Jacobian matrix by using normal information of a nearest point in an interpolating point set of the INTERPOLATING POINT SETS;

constructing a least square problem based on the Jacobian matrix and minimizing the residual by solving the least square problem;

updating the transformation matrix according to the solution, and performing a convergence test to finally obtain two fine registration results, wherein the step of performing a convergence test comprises testing whether variation of the updated transformation matrix is smaller than a threshold; and comparing minimum residual values of the two fine registration results, selecting a fine registration result of the two fine registration results with a smaller residual value as the Rt matrix from the KEY POINT SETS to the INTERPOLATING POINT SETS.

8. The device according to claim 7, wherein the selection module is configured for selecting a first frame, a last frame and a trajectory midpoint as the key frames according to the trajectory of the dynamic object in global coordinates.

9. The device according to claim 7, wherein the interpolation module is configured for performing spherical linear interpolation on directions of interpolated 3D boxes of the other frames based on the key 3D boxes, and performing Gaussian smooth interpolation on positions thereof, and the dimension being inherited from the key 3D boxes.

10. The device according to claim 7, wherein the second coordinate conversion module is configured for multiplying the key 3D boxes and the interpolated 3D boxes by an inverse of a pose matrix of a corresponding pose of the corresponding poses of the key 3D boxes and the interpolated 3D boxes to obtain the key 3D boxes and the interpolated 3D boxes in the local coordinate system; and enlarging the dimensions of the key 3D boxes and the interpolated 3D boxes in the local coordinate system, wherein point sets of the enlarged-dimension key 3D boxes and interpolated 3D boxes are used as the POTENTIAL DYNAMIC OBJECT POINT SETS.

11. The device according to claim 7, wherein the clustering module is configured for clustering the point sets in each interpolated 3D box and key 3D box to obtain multi-cluster point sets, and taking a cluster point set with most points as the point set of the dynamic object in the 3D boxes of the dynamic object sequence.

12. The device according to claim 7, wherein the 3D box conversion module is configured for performing corresponding rotation on the key 3D boxes by using a rotation matrix R, and performing corresponding translation on key 3D boxes by using a translation vector t to obtain the 3D prediction boxes at the corresponding positions, wherein the Rt matrix comprises the rotation matrix R and the translation vector t.

13. Electronic equipment comprising one or more processors, one or more computer readable storage devices, and program instructions stored on at least one of the one or more computer readable storage devices for execution by at least one of the one or more processors, wherein the program instructions are executable to perform a method in which:

multi-frame local point clouds are transformed in same time series to a same global coordinate system using corresponding poses in the multi-frame local point clouds to obtain global point clouds in the same time series;

for a certain dynamic object sequence, key frames in the global point clouds are selected according to a trajectory of the dynamic object sequence, and key three-dimensional ('3D') boxes of the dynamic object are manually labeled in the key frames;

other frames are interpolated based on the key 3D boxes to obtain interpolated 3D boxes wherein the other frames are frames other than the selected key frames;

the key 3D boxes and the interpolated 3D boxes are transformed into the local coordinate system through corresponding poses of the key 3D boxes and the interpolated 3D boxes, and potential point sets of the dynamic object ('POTENTIAL DYNAMIC OBJECT POINT SETS') are obtained according to a dimension of the key 3D boxes and the interpolated 3D boxes;

point sets in each of the interpolated 3D boxes ('INTERPOLATING POINT SETS') and key 3D boxes ('KEY POINT SETS') are clustered respectively based on the POTENTIAL DYNAMIC OBJECT POINT SETS to obtain point sets of the dynamic object in the key 3D boxes and the interpolated 3D boxes of the dynamic object sequence;

point cloud registration is performed on the INTERPOLATING POINT SETS and two of the KEY POINT SETS that are adjacent to the INTERPOLATING POINT SETS ('TWO ADJACENT KEY POINT SETS') to obtain an Rt matrix from the KEY POINT SETS to the INTERPOLATING POINT SETS; and directions and positions of the key 3D boxes are transformed through the Rt matrix, and the interpolated 3D boxes at corresponding positions are replaced to obtain 3D prediction boxes;

wherein the point cloud registration is performed on the INTERPOLATING POINT SETS and TWO ADJACENT KEY POINT SETS to obtain an Rt matrix from the KEY POINT SETS to the INTERPOLATING POINT SETS by:

computing the Rt matrix to the interpolated 3D boxes by using two adjacent key 3D boxes respectively to obtain two rough registration results;

using the rough registration results of two adjacent key frames as an initial transformation matrix, and constructing a residual and a Jacobian matrix by using normal information of a nearest point in an interpolating point set of the INTERPOLATING POINT SETS;

constructing a least square problem based on the Jacobian matrix and minimizing the residual by solving the least square problem;

updating the transformation matrix according to the solution, and performing a convergence test to finally obtain two fine registration results wherein the step of performing a convergence test comprises testing whether variation of the updated transformation matrix is smaller than a threshold; and comparing minimum residual values of the two fine registration results, selecting a fine registration result of the two fine registration results with a smaller residual value as the Rt matrix from the KEY POINT SETS to the INTERPOLATING POINT SETS.

14. The electronic equipment according to claim 13, wherein selecting key frames in the global point clouds according to a trajectory of the dynamic object sequence comprises:

selecting a first frame, a last frame and a trajectory midpoint as the key frames according to the trajectory of the dynamic object in global coordinates.

15. The electronic equipment according to claim 13, interpolating other frames based on the key 3D boxes to obtain interpolated 3D boxes comprises:

performing spherical linear interpolation on directions of interpolated 3D boxes of the other frames based on the key 3D boxes, and performing Gaussian smooth interpolation on positions thereof, the dimension being inherited from the key 3D boxes.

16. The electronic equipment according to claim 13, wherein transforming the key 3D boxes and the interpolated 3D boxes into the local coordinate system through corresponding poses, and obtaining POTENTIAL DYNAMIC OBJECT POINT SETS according to a dimension of the key 3D boxes and the interpolated 3D boxes comprises:

multiplying the key 3D boxes and the interpolated 3D boxes by an inverse of a pose matrix of a corresponding pose of the corresponding poses of the key 3D boxes and the interpolated 3D boxes to obtain the key 3D boxes and the interpolated 3D boxes in a local coordinate system; and enlarging the dimensions of the key 3D boxes and the interpolated 3D boxes in the local coordinate system, wherein point sets of the enlarged-dimension key 3D boxes and interpolated 3D boxes are used as the POTENTIAL DYNAMIC OBJECT POINT SETS.

17. The electronic equipment according to claim 13, wherein clustering the point sets in each interpolated 3D box and key 3D box respectively based on the POTENTIAL DYNAMIC OBJECT POINT SETS to obtain point sets of the dynamic object in the key 3D boxes and the interpolated 3D boxes of the dynamic object sequence comprises:

clustering the point sets in each interpolated 3D box and key 3D box to obtain multi-cluster point sets, and taking a cluster point set with most points as the point set of the dynamic object in the key 3D boxes and the interpolated 3D boxes of the dynamic object sequence.

18. The electronic equipment according to claim 13, wherein transforming the directions and positions of the key 3D boxes through the Rt matrix, and replacing the interpolated 3D boxes at the corresponding positions to obtain 3D prediction boxes comprises:

performing corresponding rotation on the key 3D boxes by using a rotation matrix R, and performing corresponding translation on key 3D boxes by using a translation vector t to obtain the 3D prediction boxes at the corresponding positions, wherein the Rt matrix comprises the rotation matrix R and the translation vector t.

19. The electronic equipment according to claim 13, wherein the one or more computer readable storage devices comprise an internal hard disk or memory, or a plug-in hard disk, Smart Media Card, SD card, or Flash Card.

* * * * *